Patented Jan. 7, 1941

2,228,033

UNITED STATES PATENT OFFICE 2,228,033

SYMPATHETIC INK

Thomas A. Martone, Wilmington, Del., assignor to E. I. du Pont de Nemours & Company, Wilmington, Del., a corporation of Delaware No Drawing. Application January 6, 1938, Serial No. 183,724

3 Claims. (Cl. 134—29)

This invention relates to a means of identifying materials such as fabrics, paper and the like; more particularly it relates to a spirit printing ink; still more particularly it relates to a rapid drying spirit ink which is normally invisible when printed upon fabrics, paper, etc., but becomes visible when the materials are wetted with a solution.

I am aware of the fact that sympathetic inks of the intaglio type containing relatively non-volatile solvents are known. These prior art compositions contain cellulose nitrate or acetate or various gums and solvents such as amyl alcohol, butyl alcohol, their esters, glycol ethers, etc., which are slow drying and are printed from engraved metal rolls.

This invention has for an object the preparation of a fast drying sympathetic ink. A further object is the preparation of a sympathetic ink which may be printed from a rubber roller. A still further object is the preparation of a sympathetic ink which may be quickly and cheaply prepared. A still further object includes a method of identifying fabrics, paper, etc. Other objects will appear hereinafter.

The above and other objects are accomplished by the following invention which comprises incorporating a colorless or slightly colored natural or synthetic gum or resin or cellulose derivative in a volatile water soluble monohydric alcohol. In the preferred embodiment of the invention it is accomplished by dissolving ethyl cellulose in methyl or ethyl alcohol.

The alcoholic solutions form a spirit ink which may be printed on paper from a rubber roll. Any form of design or indicia may be thus printed. The alcohol evaporates quickly to give an invisible print which becomes visible upon being wet by an aqueous or other liquid. The print becomes visible in water probably due to a preferential wetting of the unprinted portion, thus producing differences in refractive indices between the printed and unprinted portions of the paper.

This invention will be further understood but is not intended to be limited by the following examples wherein the parts stated are parts by weight:

Example I

One part of Manilla gum was dissolved in 25 parts of ethyl alcohol. The resulting ink when printed on paper from a rubber roll dried quickly by evaporation of the alcohol to give a print which was invisible. When the paper was immersed in water, the printed design became visible.

Methyl alcohol was substituted for ethyl alcohol. An ink of essentially the same properties was produced.

Example II

One part of Pontinac gum was dissolved in 25 parts of ethyl alcohol. An ink of the properties described in Example I was obtained. The substitution of methyl alcohol for ethyl alcohol resulted in an ink of the same excellent properties.

Example III

Pale Opaque Congo gum was substituted for the Manilla gum in Example I. An ink of the same excellent properties as noted above was obtained.

Example IV

Waxfree shellac was substituted for the Manilla gum in Example I. An ink of the properties of that cited in Example I was obtained.

Example V

One part of ethyl cellulose was dissolved by heating in 50 parts of ethyl alcohol. When cooled and printed from a rubber roll, prints similar to those described in Example I were obtained.

In a similar manner methyl alcohol was substituted for ethyl alcohol with satisfactory results. In place of ethyl cellulose other alcohol soluble cellulose ethers may be used such a methyl cellulose, benzyl cellulose, butyl cellulose,, cellulose glycolic acid, etc.

The amount of binder, that is natural or synthetic gum or resin or cellulose derivatives, dissolved in the alcohol solvent may very over wide limits. The main limiting factor is the desired viscosity of the resulting ink.

This invention possesses the advantage that it provides a means for identifying paper and the like without visible marking. An additional advantage resides in the fact that the speed of printing may be greatly increased. A further advantage resides in the fact that it is not necessary to use etched copper rolls but cheap rubber rolls may be used.

A much thinner film of material may be deposited on the paper which presents a distinct advantage. Thus the print or indicia will be even less visible when not wet than if less volatile solvents were used.

While we have disclosed the preferred embodiments of our invention, it will be readily apparent to those skilled in the art that many variations and modifications may be made therein without departing from the spirit of the invention. Accordingly, the scope of the invention is to be limited solely by the appended claims construed as broadly as permissible in view of the prior art.

I claim:

1. A sympathetic printing ink normally invisible when applied to paper consisting of a readily volatile alcohol taken from the group consisting of methyl and ethyl alcohols having dissolved therein sufficient alcohol soluble cellulose ether to render the ink of a viscosity suitable for printing purposes.

2. A sympathetic ink normally invisible when applied to paper consisting of ethyl alcohol having dissolved therein sufficient ethyl cellulose to render the ink of a viscosity suitable for printing purposes.

3. A sympathetic printing ink normally invisible when applied to paper consisting of about 50 parts of ethyl alcohol having dissolved therein about 1 part of alcohol soluble ethyl cellulose.

THOMAS A. MARTONE